United States Patent
O'Brien et al.

(10) Patent No.: US 6,349,156 B1
(45) Date of Patent: Feb. 19, 2002

(54) SEMICONDUCTOR ETALON DEVICE, OPTICAL CONTROL SYSTEM AND METHOD

(75) Inventors: Stephen O'Brien; Lars E. Eng, both of Lehigh, PA (US); Robert L. Hartman, Warren, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/429,326

(22) Filed: Oct. 28, 1999

(51) Int. Cl.$^7$ ................................................. G02B 6/12
(52) U.S. Cl. ............................ 385/14; 385/24; 372/32; 257/21; 359/260
(58) Field of Search .................... 385/14, 24; 372/32; 257/21; 359/260

(56) References Cited

U.S. PATENT DOCUMENTS

| | | | |
|---|---|---|---|
| 4,815,081 A | * | 3/1989 | Mahlein ........................ 372/32 |
| 5,227,648 A | * | 7/1993 | Woo ............................. 257/185 |
| 5,650,611 A | * | 7/1997 | Nishikawa .................... 250/225 |
| 5,760,419 A | * | 6/1998 | Nabiev ........................... 257/21 |
| 6,130,441 A | * | 10/2000 | Bowers ........................... 257/15 |

OTHER PUBLICATIONS

Hecht–Zajac, "Optics", 1979, Wesley, pp. 315.*

* cited by examiner

Primary Examiner—Darren Schuberg
Assistant Examiner—Leo Boutsikaris
(74) Attorney, Agent, or Firm—Dickstein Shapiro Morin & Oshinsky LLP

(57) ABSTRACT

A semiconductor device is provided with at least two photodetectors and an interposed etalon. Signals from the photodetectors may be compared to generate a control signal. The control signal may be used for wavelength control and/or stabilization and for other purposes. According to a preferred embodiment, the etalon is formed of at least two distributed Bragg reflectors. The etalon provides high discrimination power. In addition, the etalon has a periodic discrimination function that may be matched to the periodic channels of a dense wavelength division multiplexing system. According to one aspect of the invention, electrical current may be applied to selected layers of the device to tune and/or shift the response of the device. If desired, the invention may be incorporated into a waveguide structure, such as an optical fiber. The present invention also relates to a wafer fusion technique for making integrated devices.

29 Claims, 2 Drawing Sheets

SEMICONDUCTOR ETALON DEVICE, OPTICAL CONTROL SYSTEM AND METHOD

BACKGROUND OF THE INVENTION

The present invention relates generally to devices for detecting or measuring wavelength-dependent characteristics. The present invention also relates to a system for providing wavelength control and/or stabilization of an optical system. The present invention also relates to a method of making devices with an integrated etalon structure.

Dense wavelength division multiplexing (DWDM) systems may require tight wavelength control to operate at standard channels (wavelengths). In addition, such systems may require accurate wavelength stabilization to ensure continued operation at the desired channels over the life of the product. For certain DWDM systems, the degree of wavelength stabilization accuracy may be +/−2.5 GHz out of 193 THz, which is equivalent to +/−12 parts per million. Peak discrimination powers of about 3 to 7 $nm^{-1}$ may be required to achieve a locking accuracy of +/−2.5 GHz.

U.S. Pat. No. 5,760,419 (Nabiev) refers to a wavelength meter and photodetector for use in wavelength division multiplexing (WDM) systems. The Nabiev device is formed of a distributed Bragg reflector (DBR) located in series between two photodiodes. The Nabiev device has several disadvantages. Among other things, the single-pass operation of the DBR in the Nabiev device does not lend itself to high discrimination power, as discussed in more detail below. Moreover, the Nabiev device does not operate according to a periodic transmission function. Consequently, the Nabiev device cannot be used to generate multiple signals for respective multiple wavelength regions limiting the wavelength usage of the device.

SUMMARY OF THE INVENTION

The present invention relates to an integrated semiconductor device that has first and second photodiodes and a semiconductor etalon integrally formed between the photodiodes. According to one aspect of the invention, the photodiodes are formed of alternating p- and n-type doped semiconductor materials, with photon-absorbing active material located between the doped layers. Contacts may be used to transmit signals from the photodiodes to a suitable processor for use in wavelength control and/or stabilization.

According to a preferred embodiment of the invention, the etalon is formed of at least two distributed Bragg reflectors (DBRs). The DBRs may be formed of AlGaAs or other suitable semiconductor materials. The DBRs may be attached by wafer fusion to opposite sides of the etalon center (optical cavity).

The present invention also relates to an integrated optical device for wavelength detection. The integrated device includes photodiodes for generating photoresponse signals and a discriminating semiconductor etalon located between the photodiodes. The signals may be transmitted to a suitable device for comparison. According to a preferred embodiment of the invention, the etalon selectively transmits radiation according to a periodic wavelength function.

If desired, the present invention may be incorporated into a waveguide structure, such as an optical fiber. The waveguide structure may have anti-reflective components, for example, for transmitting and receiving radiation at opposite ends.

The present invention also relates to a method of operating an optical system. The method includes the steps of transmitting radiation through a first photodetector, then through a semiconductor etalon, and then into a second photodetector. The method also includes the steps of adjusting a semiconductor etalon by applying electric current through the etalon and/or by changing the temperature of the etalon. In addition, the method includes the steps of comparing electrical signals from the photodetectors, and generating control signals based on the comparison.

According to a preferred embodiment of the invention, the control signals may be used for wavelength control, locking and/or stabilization in a dense wavelength division multiplexing (DWDM) system. The control signals may have a periodic function (with multiple peaks at predetermined resonant frequencies) to control multiple channels of the DWDM system.

The present invention also relates to a method of making integrated wavelength meters and other wavelength-responsive semiconductor devices. The method includes the steps of depositing mirrors and photodetectors on respective substrates, and then attaching the mirror/photodetector units to opposite sides of an optical cavity. Wafer fusion techniques may be used to attach the components together to form a monolithic finished product. In a preferred embodiment of,the invention, the substrates are separated from the mirrors by etching. The mirrors may be formed of semiconductor DBRs.

The resonant, multi-pass operation of the etalon structure of the present invention may be used to provide very high wavelength discrimination power. A preferred embodiment of the invention may have a discrimination power in the range of from 1 to 30 $nm^{-1}$. Such high wavelength discrimination power may be sufficient to achieve improved locking accuracy in DWDM systems.

In addition, the periodic nature of the etalon transmission function provides a robust design because it can be matched to the periodic structure of standardized channel settings.

According to another aspect of the invention, the DBRs for the etalon structure may have relatively uncomplicated structures. If one were to attempt to construct a high resolution discriminator using just a single DBR, it might be necessary to use at least 100 pairs of alternating AlGaAs materials. Substantially more pairs would be needed if InGaAsP materials were used due to the lower available Δn. Such complicated structures would form broadening and/or scattering mechanisms and would have significant design limitations. In the present invention, DBRs for the etalon structure may be formed with relatively few layers in each stack. Consequently, the invention provides design flexibility, for example to flow current through a mirror, or to employ thinner mirrors to facilitate etch processing.

BRIEF DESCRIPTION OF THE DRAWINGS

These and other advantages and features of the invention will be more clearly understood from the following detailed description provided in connection with the accompanying drawings in which.

DETAILED DESCRIPTION OF PREFERRED EMBODIMENTS

Figure 1:
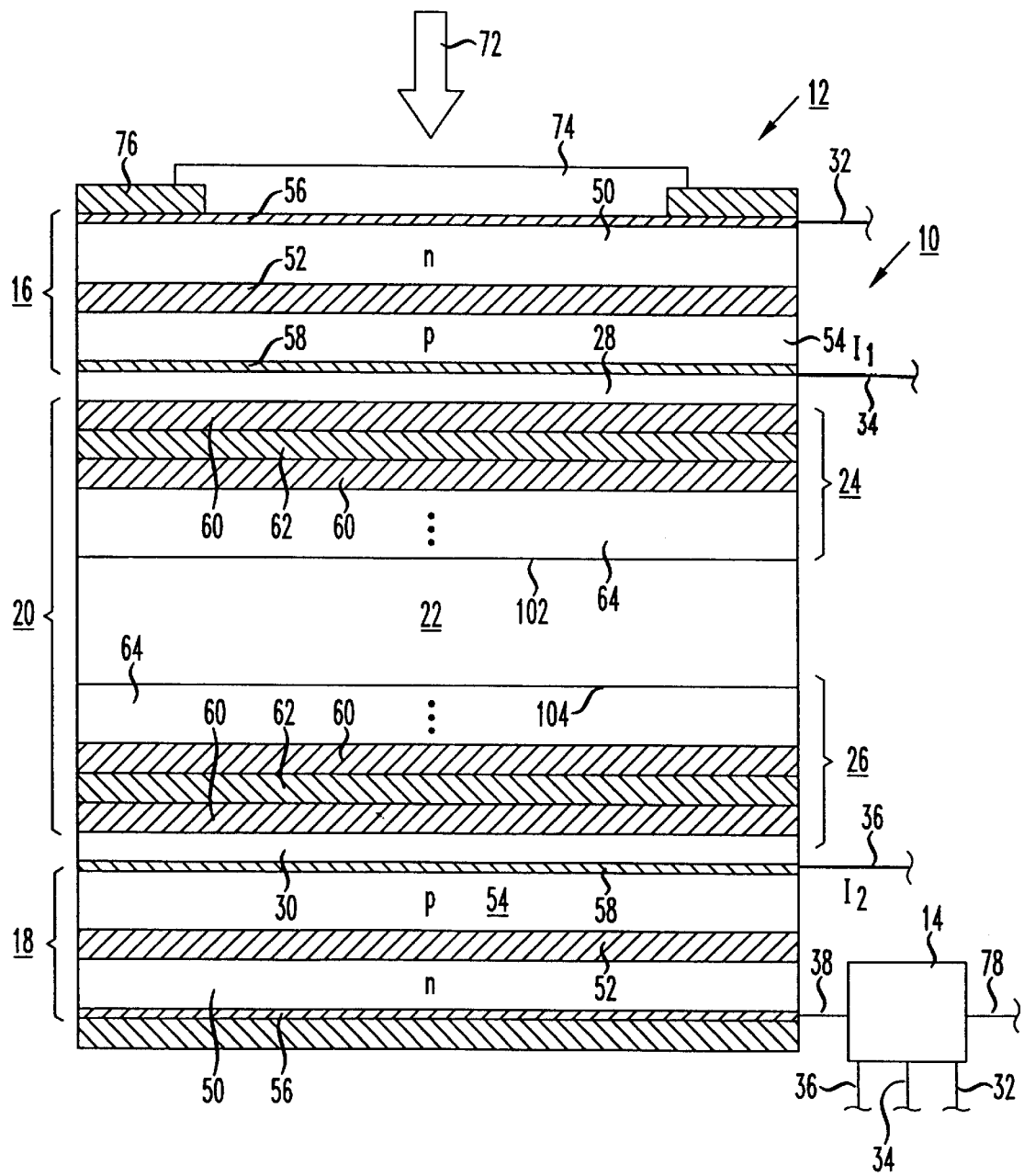
FIG. 1 is a schematic view of an optical control system constructed in accordance with a preferred embodiment of the present invention.

Referring now to the drawings, where like reference numerals designate like elements, there is shown in FIG. 1 an optical control system 10 constructed in accordance with a preferred embodiment of the present invention. The system 10 includes a semiconductor etalon device 12 and a signal processor 14. The etalon device 12 includes first and second photodiodes 16, 18. A wavelength-dependent etalon 20 is located between the photodiodes 16, 18. The etalon 20 is formed of an optical cavity 22, formed of AlGaAs or another suitable semiconductor material, and distributed Bragg reflectors (DBRs) 24, 26. Suitable spacers 28, 30 may be located between the photodiodes 16, 18 and the DBRs 24, 26, if desired. The spacers 28, 30 may be formed of GaAs or another suitable material. The photodiodes 16, 18 may be connected to the processor 14 by suitable signal lines 32, 34, 36, 38.

In the illustrated embodiment, the first photodiode 16 has a first layer 50 formed of n-doped semiconductor material, an active layer 52, and a second layer 54 formed of p-doped semiconductor material. The first and second layers 50, 54 may be formed of AlGaAs or another suitable material. The active layer 52 contains photodetecting material capable of absorbing photons and generating an electrical response. The active layer 52 may be formed of InGaAs or another suitable material. As photons are absorbed in the active layer 52, a current $I_1$ is generated across the first signal lines 32, 34. The signals lines 32, 34 may be connected to the first photodiode 16 by suitable transparent contacts 56, 58.

The first DBR 24 may be formed of alternating layers 60, 62 of semiconductor material. The layers 60, 62 may have different refractive indices and thicknesses as is known in the art. Although only three layers 60, 62 are shown in FIG. 1, it should be understood that the first DBR 24 may have several pairs of layers 60, 62. The additional layers are designated schematically by reference numeral 64. The DBR 24 may be formed of five pairs of layers 60, 62, for example.

The structure of the second DBR 26 may be similar to that of the first DBR 24. Likewise, the structure of the second photodiode 18 may be similar to that of the first photodiode 16. If desired, the active layer 52 of the second photodiode 18 may have more quantum wells than that of the first photodiode 16, such that the first photodiode 16 is more sensitive than the second photodiode 18. The present invention should not be limited, however, to the specific instrumentalities and structures described and illustrated herein.

The wavelength-dependent reflectivity of the DBRs 24, 26 may be as low as 20% to 40% to achieve discrimination powers in excess of 5 $nm^{-1}$. In a preferred embodiment of the invention, however, the reflectivities of tie DBR mirrors 24, 26 in the operating range are each about 45%.

In operation, a light beam 72 is transmitted through an anti-reflective (AR) coating 74. The AR coating 74 may be formed in an opening etched in a metal layer 76. Photons traveling through the first photodiode 16 have a certain probability of being detected (through absorption) by the first active layer 52. Photons that are not absorbed by the first photodiode 16 propagate to the etalon 20. The etalon 20 is a wavelength-dependent discriminator. Some of the photons are transmitted through the etalon 20, with the probability of transmission being a periodic wavelength-dependent function.

Figure 2:
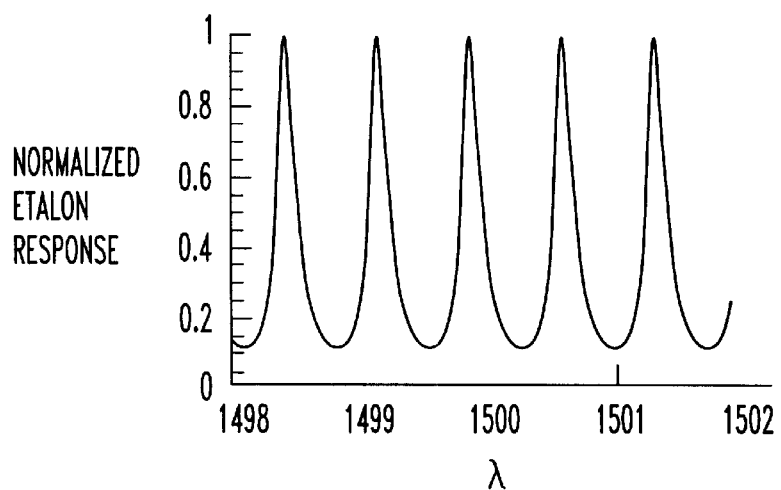
FIG. 2 illustrates the wavelength-dependent transmission function for the control system of FIG. 1.
Figure 3:
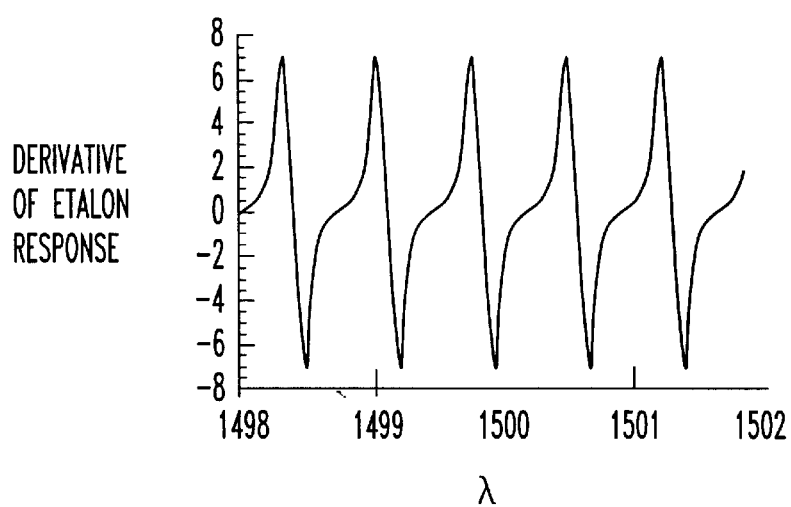
FIG. 3 illustrates the periodic discrimination function for the control system of FIG. 1.

A representative periodic function for the illustrated embodiment is shown in FIG. 2 for wavelengths useful in optical fiber transmission systems. FIG. 2 plots transmission through the etalon 20 (from 0 to 100%) as a function of wavelength (in nanometers). FIG. 3 shows the corresponding slope function, with discriminating power ($nm^{-1}$) plotted as a function of wavelength (nm).

The photons that are transmitted through the etalon 20 enter the second photodiode 18, where they are detected (absorbed) in the second active layer 52. The signal ($I_2$) on lines 36, 38 generated by the second photodiode 18 and the signal $I_1$ generated by the first photodiode 16 may be compared by the processor 14 to generate a control signal correlated to the high transmission wavelengths shown in FIG. 2. The control signal may be input to a control loop 78 to control, lock and/or stabilize the periodic channels of a DWDM system (not illustrated).

If desired, the device 12 may be adjusted by subjecting one or more layers to an electrical current to adjust the Δn of those layers. The ability to apply current to the etalon 20 allows one to tune the device 12 and make an array of devices all with slightly shifted response which will give full wavelength response. Thus, for example, the center portion 22 of the etalon 20 can be altered by passing current through it resulting in a current controlled free-spectral-range to provide design flexibility.

In a preferred embodiment of the invention, all or most of the semiconductor layers of the device 12 may be formed of AlGaAs materials. Such materials are preferred because they provide large Δn values. Relaxed InGaAs may be used for the active region 52. In an alternative embodiment of the invention, all of the semiconductor layers in the device 12 may be formed of InGaAsP compounds with lattice-matched, or at least near lattice-matched, active regions.

The semiconductor materials of the present invention are preferred over fused silica because they have a higher refractive index (for example, n=3.5). The refractive index of the semiconductor materials may be approximately twice as high as that of fused silica (n=1.5). Consequently, the present invention may have less stringent divergence requirements for the incident beam 72 than would be the case if fused silica were used.

Further, the device 12 may be temperature sensitive since the temperature dependence of the refractive index of the semiconductor materials (approximately 10 GHz/° C.) is larger than that of fused silica (approximately 1.2 GHz/° C.). If desired, this temperature sensitivity may be used to provide active control of the device 12. According to one aspect of the invention a micro-heater (not pictured) may be used to heat one side of the device 12 more than the other to produce a desired Δn.

If desired, the entire structure 12 shown in FIG. 1 may be grown in a single growth according to known semiconductor manufacturing processes. However, the thickness of the etalon 20 may be relatively large (for example, 200 to 800 μm). Growing such a thick component in a single growth with the other components 24, 26, 16, 18 may be unacceptably time-consuming. Thus, the device 12 may be formed according to wafer fusion techniques. In particular, the DBRs 24, 26 and the photodiodes 16, 18 may be grown on separate substrates (not shown). First the DBRs 24, 26 are grown on the substrates, and then the photodiodes 16, 18 are grown on the respective DBRs 24, 26. The substrates are then removed (for example, by etching) from the DBR/photodiode units, and then the DBR/photodiode units are fused to the polished flat and parallel opposite sides 102, 104 of the etalon material 22.

According to another aspect of the invention, a plurality of control systems 10 may be incorporated into a single apparatus. The present invention should not be limited to the devices shown and described herein in detail.

Figure 4:
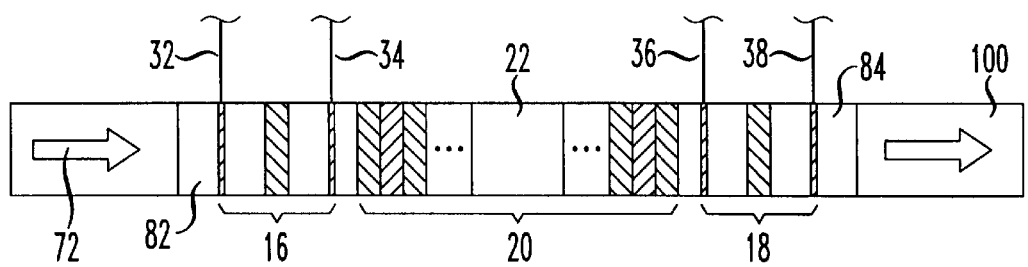
FIG. 4 is a schematic view of an optical waveguide constructed in accordance with another preferred embodiment of the present invention.

Referring now to FIG. 4, there is a shown a waveguide structure 100 constructed in accordance with the present invention. The waveguide structure 100 incorporates the photodiodes 16, 18 and discriminator 20 of the embodiment shown in FIG. 1, except that the components are arranged in an optical fiber with anti-reflective components 82, 84 on both ends. The waveguide structure 100 may be used, for example, as a semiconductor amplifier with multiple contacts.

The present invention may also be used as a temperature sensor. According to one aspect of the invention, the device 12 may be used to detect infrared radiation of predetermined wavelengths. The detected wavelengths may be correlated to the temperature of the radiating body. According to another aspect of the invention, the incident radiation 72 may remain constant and the body of the device 12 may be subject to changing temperatures. As the temperature of the device 12 changes, the output signals $I_1$, $I_2$ would change in response, and the signals may be used to determine the device temperature.

While a preferred embodiment of the invention has been described and illustrated, it should be apparent that many modifications can be made to the invention without departing from its spirit or scope. Accordingly, the invention is not limited by the foregoing description or drawings, but is only limited by the scope of the appended claims.

What is claimed as new and desired to be protected by Letters Patent of the United States is:

1. An integrated semiconductor device, comprising:
   first and second photodiodes; and
   an adjustable etalon formed of semiconductor material, said etalon being located between said photodiodes.

2. The device of claim 1, wherein said photodiodes comprise doped semiconductor materials.

3. The device of claim 2, wherein said photodiodes comprise active material located between said doped semiconductor materials.

4. The device of claim 3, further comprising contacts for transmitting electrical signals, said contacts being connected to said photodiodes.

5. The device of claim 1, wherein said etalon comprises a distributed Bragg reflector formed of semiconductor material.

6. The device of claim 1, wherein said etalon comprises first and second distributed Bragg reflectors and an etalon center, and wherein said etalon center is located between said distributed Bragg reflectors.

7. An integrated optical device for detecting wavelength characteristics, said device comprising:
   first and second photodiodes for generating photoresponse signals;
   an adjustable etalon for transmitting radiation from said first photodiode to said second photodiode, said etalon being formed of semiconductor material; and
   contacts for transmitting said photoresponse signals, said contacts being connected to said photodiodes.

8. The device of claim 7, wherein said photodiodes comprise doped semiconductor materials, and active material located between said doped semiconductor materials.

9. The device of claim 8, wherein said etalon is arranged to discriminate radiation according to a periodic function.

10. The device of claim 9, wherein said etalon comprises distributed Bragg reflectors.

11. The device of claim 10, wherein said distributed Bragg reflectors are located between said photodiodes.

12. The device of claim 10, wherein said distributed Bragg reflectors comprise AlGaAs.

13. The device of claim 7, further comprising a waveguide structure.

14. The device of claim 13, wherein said waveguide structure comprises anti-reflective components for transmitting radiation, said photodiodes being located between said anti-reflective components.

15. A method of operating an optical system, said method comprising the steps of:
   transmitting radiation through a first photodetector, then through a semiconductor etalon, and then into a second photodetector;
   communicating photoresponse signals from said photodetectors;
   generating a control signal based on a comparison of said photoresponse signals; and
   adjusting said semiconductor etalon.

16. The method of claim 15, wherein said adjusting step comprises the step of applying electrical current to said etalon.

17. The method of claim 15, wherein said adjusting steps comprises the step of applying heat to a side of said etalon.

18. The method of claim 15, wherein said adjusting step comprises the step of changing the temperature of said etalon.

19. The method of claim 15, wherein said optical system comprises a wavelength division multiplexing system.

20. The method of claim 15, wherein said optical system comprises a dense wavelength division multiplexing system.

21. The method of claim 20, wherein said control signal has a periodic function to control multiple aspects of said dense wavelength division multiplexing system.

22. The method of claim 15, further comprising the step of using said control signal to control wavelength characteristics of said optical system.

23. The method of claim 15, further comprising the step of using said control signal to stabilize wavelength characteristics of said optical system.

24. A method of making a wavelength-dependent semiconductor device, said method comprising the steps of:
   forming a partially reflective mirror on a substrate;
   forming a photodetector on said partially reflective mirror; and
   attaching said partially reflective mirror to an etalon center.

25. The method of claim 24, further comprising the step of separating said mirror from said substrate.

26. The method of claim 25, wherein said step of separating said mirror from said substrate comprises etching said substrate.

27. A method of making an integrated semiconductor device, said method comprising the steps of:
   providing a first distributed Bragg reflector;
   forming a photodiode on said distributed Bragg reflector; and
   subsequently, forming a semiconductor etalon by locating an optical cavity between said first distributed Bragg reflector and a second distributed Bragg reflector.

28. The method of claim 27, further comprising the step of depositing a photodiode on said second distributed Bragg reflector, and wherein said depositing step occurs before said step of forming said semiconductor etalon.

29. The method of claim 28, firther comprising the step of locating electrical contacts in said photodiodes.

* * * * *